Nov. 20, 1962 R. E. PRICE 3,064,395
DEVICE FOR EFFECTING AXIAL ALIGNMENT BETWEEN
A TOOL AND WORKPIECE
Filed April 17, 1959 4 Sheets-Sheet 1

INVENTOR
RALPH E. PRICE
BY
ATTORNEY

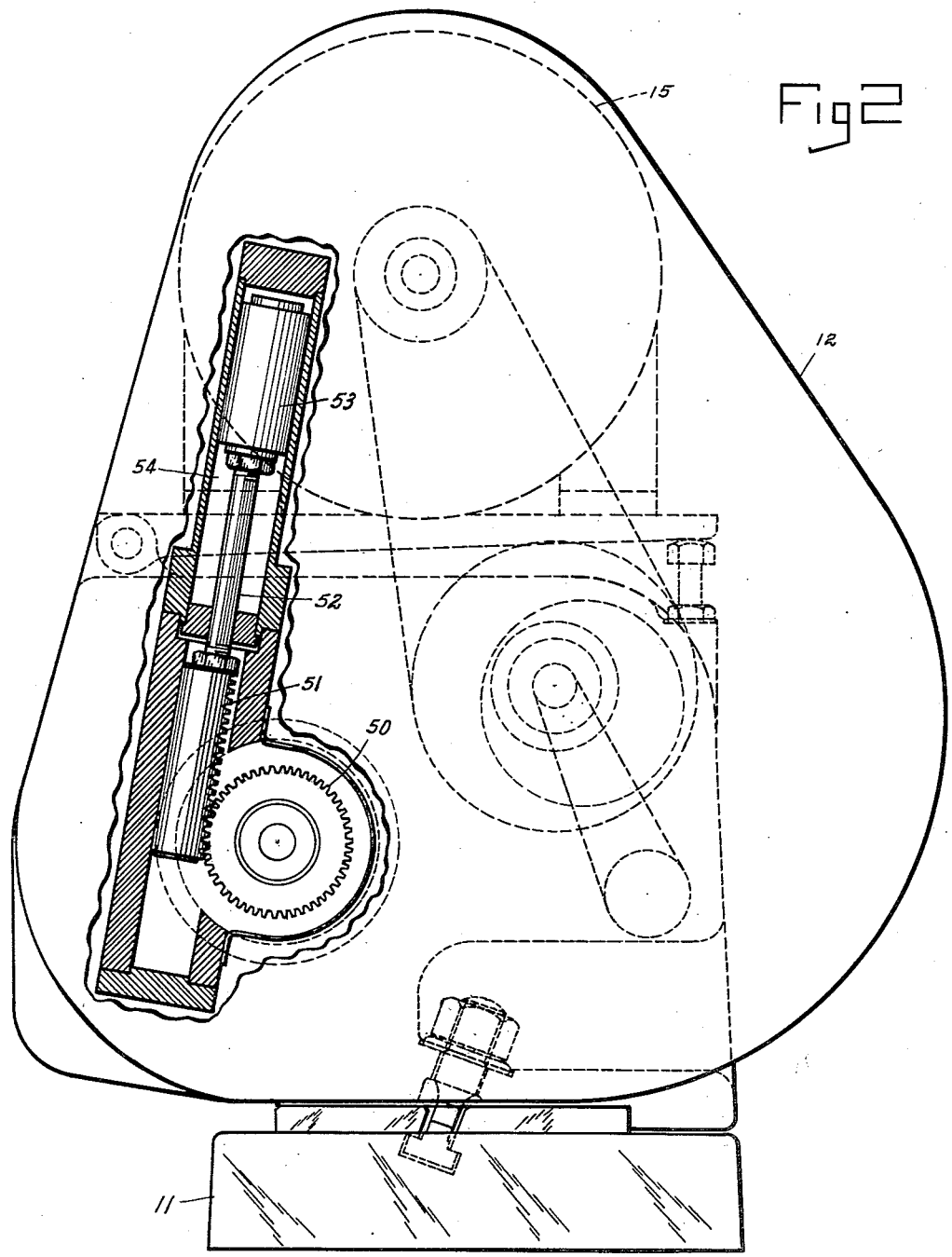

Nov. 20, 1962   R. E. PRICE   3,064,395
DEVICE FOR EFFECTING AXIAL ALIGNMENT BETWEEN
A TOOL AND WORKPIECE
Filed April 17, 1959   4 Sheets-Sheet 3
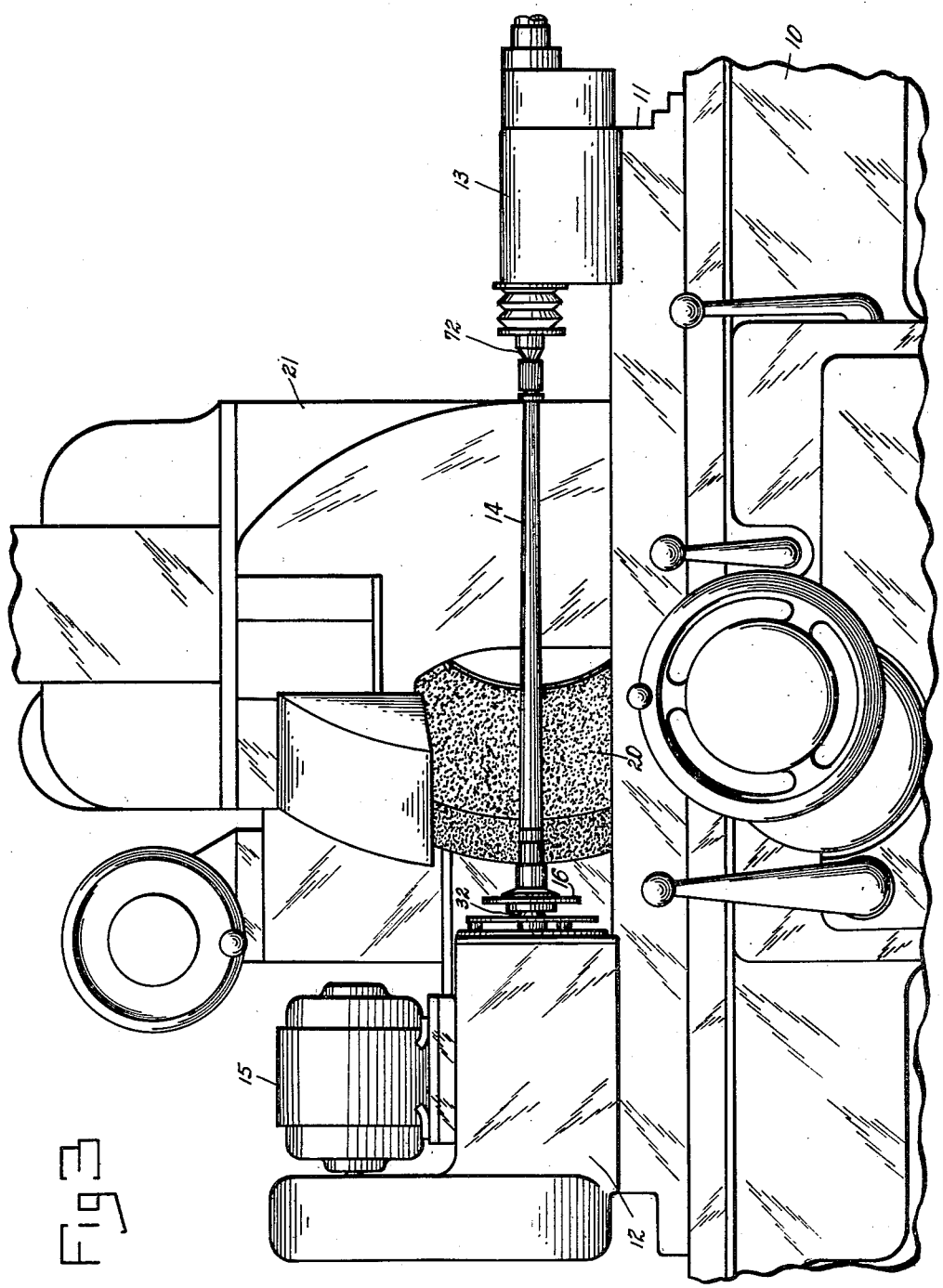
INVENTOR
RALPH E. PRICE
BY
ATTORNEY

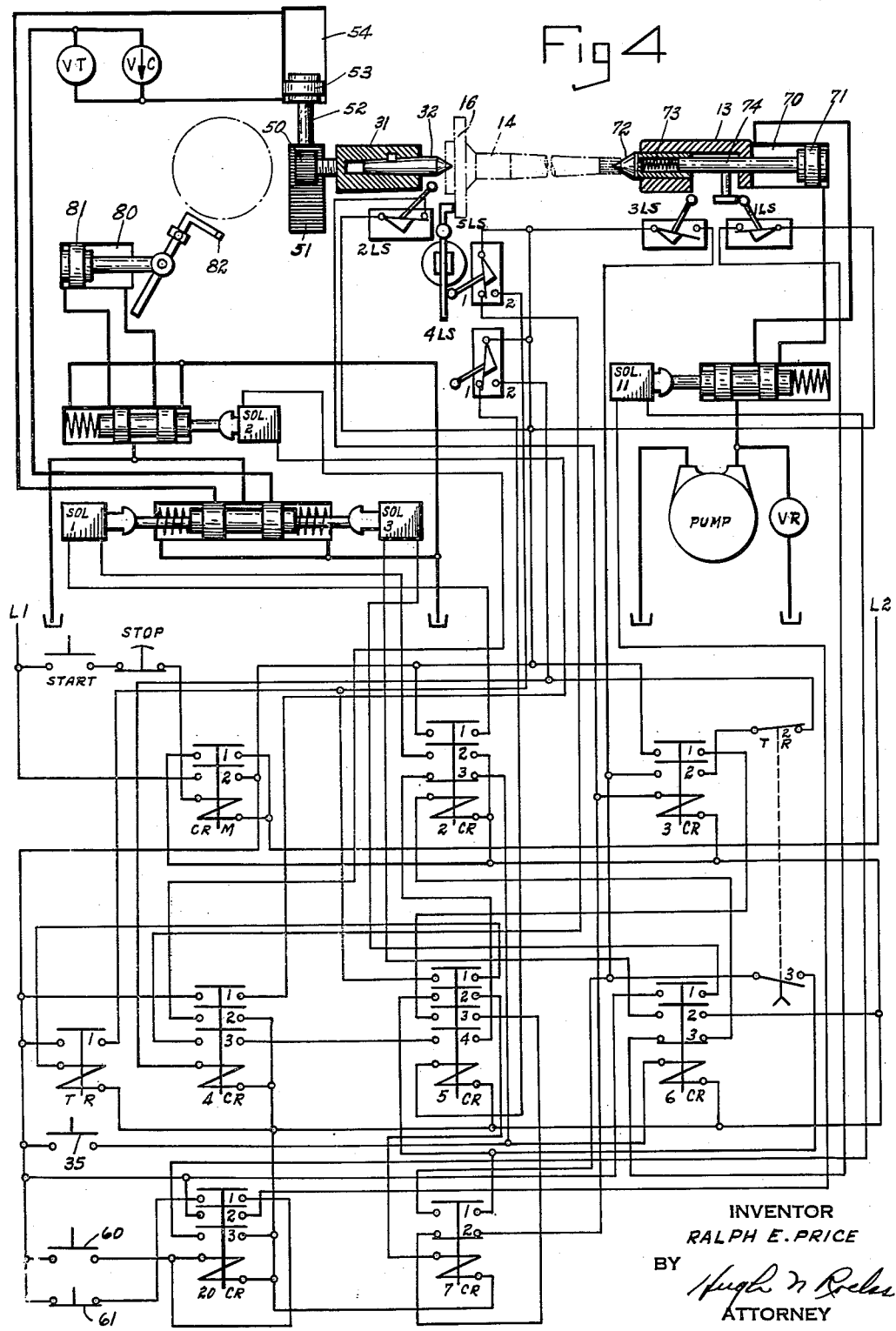

United States Patent Office 3,064,395
Patented Nov. 20, 1962

3,064,395
DEVICE FOR EFFECTING AXIAL ALIGNMENT
BETWEEN A TOOL AND WORKPIECE
Ralph E. Price, Waynesboro, Pa., assignor to Landis Tool Company, Waynesboro, Pa.
Filed Apr. 17, 1959, Ser. No. 807,086
5 Claims. (Cl. 51—165)

This invention relates to grinding machines, particularly the work supporting elements of a grinding machine, and more particularly, to means for locating a workpiece in predetermined axial relation to a grinding wheel.

Previous devices for performing an axial locating operation of a workpiece required the longitudinal movement of the entire work carriage or, where possible, the axial movement of the workpiece itself relative to the supporting means. The supporting means is generally a pair of pot chucks. A workpiece which must be mounted on centers cannot very well be moved endwise without also moving the centers.

It is, therefore, an object of this invention to provide means for effecting an axial locating movement of a workpiece relative to a grinding wheel.

Another object is to provide means whereby the headstock and footstock centers may be moved endwise, carrying the workpiece with them to position it axially relative to the grinding wheel.

Another object is to provide means for effecting a precision endwise movement of the headstock center.

Another object is to provide means whereby the footstock center holds the workpiece against the headstock center and causes the workpiece to move endwise with the endwise movement of the headstock center.

Another object is to provide means for determining when the workpiece reaches the desired axial position.

Another object is to provide means for stopping the precision endwise movement of the headstock center when the workpiece reaches the predetermined position relative to the grinding wheel.

FIGURE 2 is a left hand end elevation of the headstock broken away to show the means for effecting endwise adjustment of the work center.

FIGURE 3 is a front elevation of the grinding machine to which the invention is applied.

FIGURE 4 is a hydraulic and electric diagram.

Figure 1:
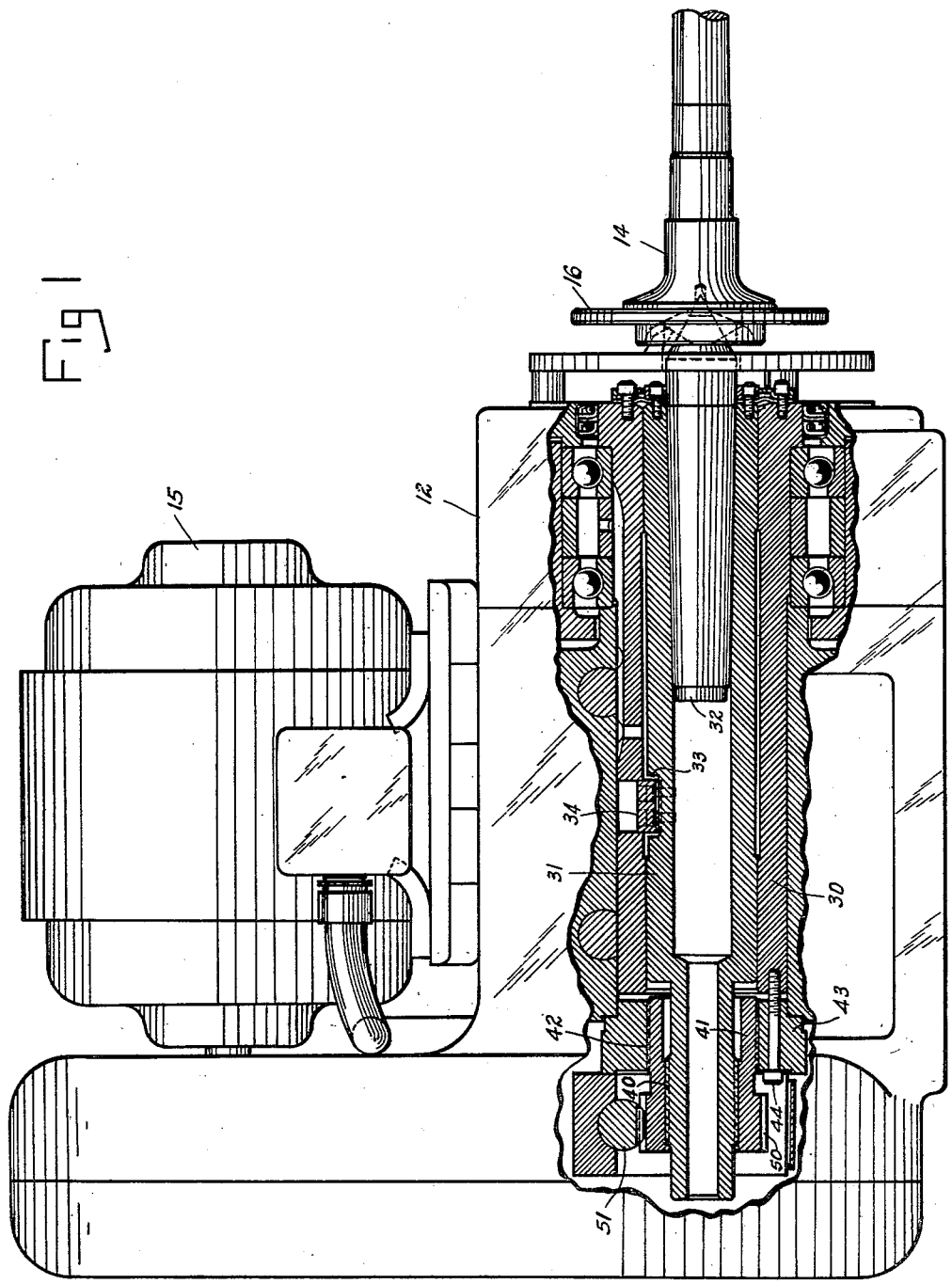
FIGURE 1 is a front elevation of a headstock, partly in section.

The bed of the machine is indicated by numeral 10. Headstock 12 and footstock 13 are mounted on carriage 11 on bed 10 to rotatably support workpiece 14 for a grinding operation. Motor 15 on headstock 12 is suitably connected to drive workpiece 14.

Grinding wheel 20 is rotatably mounted in wheel support 21. Wheel support 21, in this case, is set at an angle of 30° so that grinding wheel 20 has an operative face which is conical in shape rather than cylindrical.

Spindle 30 is non-rotatably supported in headstock 12. Quill 31 is slidably mounted in spindle 30 for limited axial movement. Quill 31 carriers a work center 32 in the right hand end. Slot 33 in quill 31 co-acts with stop member 34 in spindle 30 to determine the extent of endwise movement of quill 31 and work center 32.

The means for effecting endwise movement of quill 31 consists of a left hand threaded portion 40 on the left end of quill 31 on which is mounted a sleeve 41. Sleeve 41 has a right hand threaded portion 42 which is threaded into a collar 43 attached to spindle 30 by screws 44. At the left end of sleeve 41 is formed a pinion 50 in operative engagement with rack 51. Rack 51 is attached to piston rod 52 of piston 53. Piston 53 is mounted in cylinder 54. Thread portions 40 and 42 have different leads and are in opposite directions so that the actual movement of quill 31 is the difference between the leads of the threaded portions 40 and 42.

Where the axial adjustment of spindle 30 is required only for the set-up of the machine, the rack and pinion means for rotating sleeve 41 may be eliminated and provisions made for manually effecting the adjustment.

Footstock 13 has a hollow footstock center 72. The means for moving footstock center 72 to engage workpiece 14 consists of piston 71 in cylinder 70 forming a part of footstock 13. Piston rod 74 is inserted in center 72 and acts on said center 72 through spring 73. The means for stopping the endwise movement of work center 32 and thus workpiece 14 consists of stylus 82 which may be swung into and out of operative relation to flange 16 of workpiece 14 by means of piston 81 slidably mounted in cylinder 80. When stylus 82 is in engagement with flange 16 of workpiece 14, the endwise movement of spindle 30 and flange 16 permits counter-clockwise movement of said stylus 82 which, in turn, releases limit switch 5LS to stop the endwise movement of work center 32 with workpiece 14 in the desired axial position relative to grinding wheel 20.

Operation

With the start switch closed and before the beginning of the operating cycle, limit switch 2LS and limit switch 3LS are opened.

Limit switch 1LS is closed to provide a circuit through normally closed control relay contact 6CR3 to energize control relay 2CR.

Limit switch contact 4LS1 is closed to energize control relay 5CR.

Limit switch 5LS is closed in a circuit which includes normally open control relay contacts 4CR3 and 5CR2 and normally closed control relay contact 2CR3 to control relay 6CR.

Thus, at the beginning of the cycle, control relays 2CR and 5CR are energized.

Control relay contacts 2CR1 and 2CR2 energize headstock valve solenoid 1 to reset the headstock center 32 to the right, closing limit switch 2LS.

Limit switch 2LS and control relay contact 5CR3 provide parallel circuits to energize control relay 3CR.

Control relay contact 3CR1 provides a holding circuit through control relay contact 5CR1.

Workpiece 14 is placed between centers and the footstock switch 60 is closed to energize control relay 20CR.

Control relay contacts 20CR1 and 20CR2 energize footstock valve solenoid 11, shifting said valve to the right and directing fluid to the head end of the foostock cylinder 70 causing footstock piston 71 to move to the left.

Piston 71 acts through spring 73 to move footstock center 72 to the left to engage the workpiece 14 and at the same time to close limit switch 3LS and open limit switch 1LS.

Opening limit switch 1LS deenergizes control relay 2CR and valve solenoid 1 to release the headstock valve solenoid 3 to central position.

Closing limit switch 3LS completes a circuit through control relay contact 3CR2 to energize control relay 4CR.

Control relay contacts 4CR1 and 4CR2 energize stylus valve solenoid 2, shifting said valve to the left and directing fluid to cylinder 80 moving piston 81 and swinging stylus 82 into the path of the flange 16 on workpiece 14.

Control relay contact 4CR3 completes a circuit from limit switch 5LS through control relay contact 5CR2 and normally closed control relay contact 2CR3 to energize control relay 6CR.

Control relay contacts 6CR1 and 6CR2 energize headstock valve solenoid 3, shifting said valve to the left to direct fluid to the head end of cylinder 54 to start the retraction of headstock center 32. During this movement, workpiece 14 is urged resiliently against headstock spindle 30 by movement of footstock center 72 to the left. The work moves to the left at a rate determined by the rate of retraction of the headstock spindle 30 until the flange 16 on workpiece 14 engages stylus 82, which, in turn, opens limit switch 5LS and closes limit switch contact 5LS2 to deenergize control relay 6CR. For set-up, control relay 6CR may be energized by closing switch 35.

The retracting movement also releases limit switch 2LS to open a circuit to control relay 3CR. However, control relay 3CR is held through control relay contacts 3CR1, 5CR3 and 7CR2.

Control relay contacts 6CR1 and 6CR2 open to deenergize valve solenoid 3, permitting the headstock valve to center and stopping the retracting movement.

Limit switch contact 5LS2 energizes timer TR in the circuit to control relay 4CR which times open after an interval sufficient to determine whether the work has overrun the locating point.

Opening of timer contact TR2 deenergizes control relay 4CR, opening control relay contacts 4CR1 and 4CR2 to deenergize stylus valve solenoid 2. The valve moves to the right and directs fluid to the rod end of stylus cylinder 80 retracting stylus 82 from the path of workpiece 14.

If the locating movement fails to stop at the locating point, it will close limit switch contact 4LS2 to provide a direct circuit to maintain control relay 4CR energized and prevent withdrawal of stylus 82 from operating position. The locating cycle will then be repeated.

Footstock retract switch 61 is opened to deenergize control relay 20CR and reverse footstock valve solenoid 11 to retract the footstock 13, opening limit switch 3LS and closing limit switch 1LS and returning all elements to their positions for the start of the locating cycle as described above.

For the purpose of illustration, the invention has been shown with the locating movement taking place in the direction from right to left. However, the invention may be used with the locating movement taking place in either direction.

I claim:

1. In a machine tool, a work support, means for rotatably supporting a workpiece on said work support comprising a headstock and a footstock, each having an axially movable center, power means for effecting axial movement of one of said centers to engage a workpiece and move it into operative engagement with said other center, control means responsive to movement of said first mentioned center to start endwise movement of said other center to cause endwise movement of said workpiece, locating means in the path of said workpiece, and control means actuated thereby when said workpiece reaches a predetermined endwise position for stopping said movement of said other center.

2. In a machine tool, a work support, means for rotatably supporting a workpiece on said work support comprising a headstock and a footstock, each having an axially movable center, power means for effecting axial movement of one of said centers to engage a workpiece and move it into operative engagement with said other center, locating means and control means responsive to movement of said first mentioned center to start endwise movement of said other center to cause endwise movement of said workpiece toward said locating means.

3. In a machine tool, a work support, means for rotatably supporting a workpiece on said work support comprising a headstock center and a footstock center, each being axially movable, power means for effecting axial movement of said centers to engage a workpiece and to cause endwise movement of said workpiece, locating means, and means for moving said locating means into and out of the path of said workpiece, and control means actuated by movement of said footstock center to actuate the means for moving said locating means into the path of said workpiece.

4. In a machine tool, a work support, means for rotatably supporting a workpiece on said work support comprising a headstock center and a footstock center, each being axially movable, power means for effecting axial movement of said centers to engage a workpiece to cause endwise movement of said workpiece, locating means, and means for moving said locating means into and out of the path of said workpiece, control means actuated by movement of said footstock center to actuate the means for moving said locating means into the path of said workpiece, and control means actuated by said locating means in response to movement of said workpiece to the desired position, to return said locating means to inoperative position.

5. In a machine tool, a work support, means for rotatably supporting a workpiece on said work support comprising a headstock and a footstock, each having an axially movable center, power means for effecting axial movement of said centers to engage a workpiece to cause endwise movement of said workpiece, locating means, and means for moving said locating means into and out of the path of said workpiece, control means actuated by movement of one of said centers to actuate the means for moving said locating means into the path of said workpiece, and control means operable in the event that said workpiece overruns the desired location to cause said locating means to remain in operative position until the locating cycle can be repeated.

References Cited in the file of this patent

UNITED STATES PATENTS

| | | |
|---|---|---|
| 355,829 | Lindstrom et al. | Jan. 11, 1887 |
| 1,297,396 | Olson | Mar. 18, 1919 |
| 2,559,431 | Hollengreen et al. | July 3, 1951 |
| 2,955,391 | Fred | Oct. 11, 1960 |

FOREIGN PATENTS

| | | |
|---|---|---|
| 742,658 | Great Britain | Dec. 30, 1955 |